Patented Dec. 11, 1951

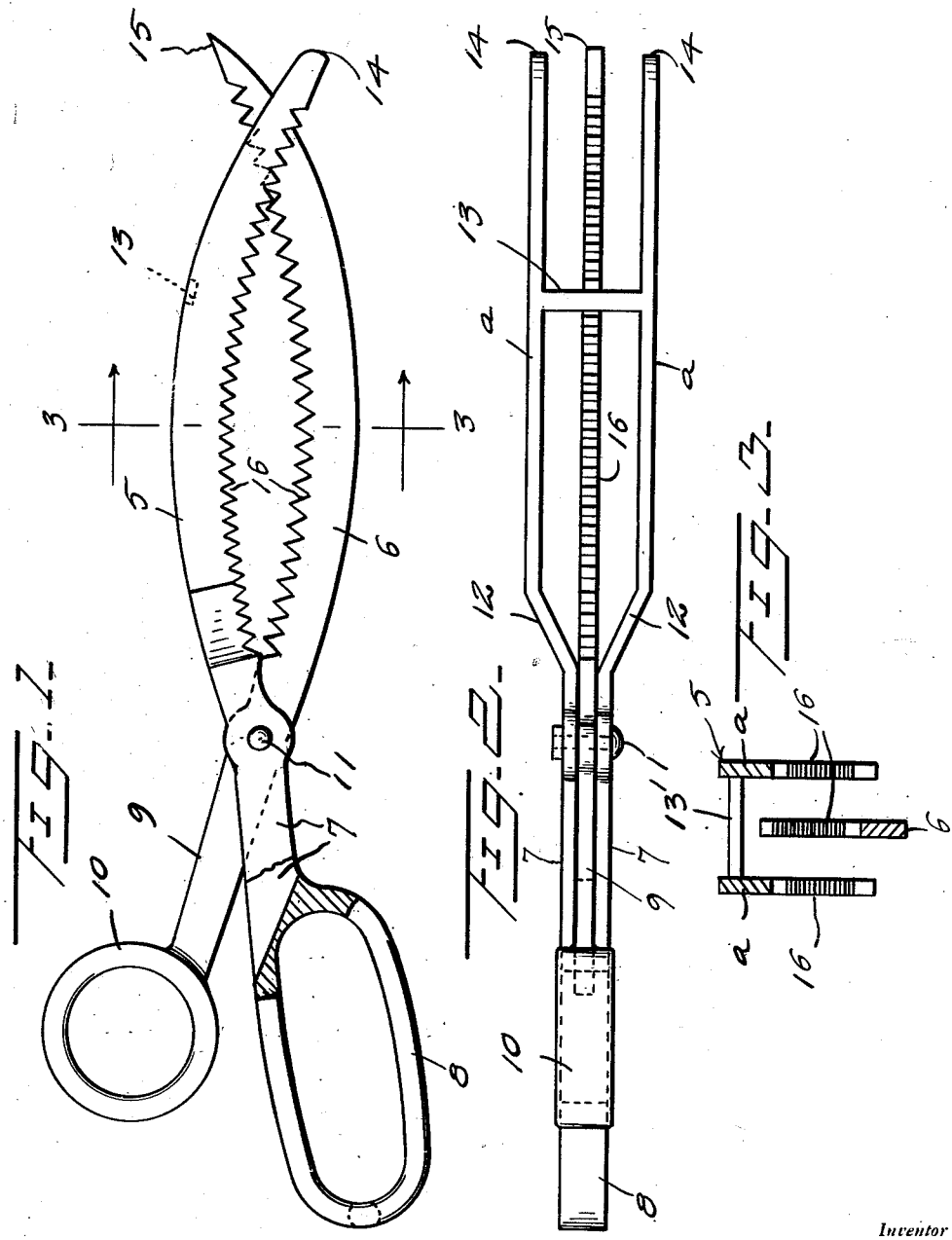

2,578,344

UNITED STATES PATENT OFFICE 2,578,344

FISH AND CRAB TONGS

William Lloyd Everett, Wilmington, N. C.

Application April 22, 1946, Serial No. 664,111

1 Claim. (Cl. 294—106)

The present invention relates to improvements in tools or tongs for holding fish, crabs and other items.

The principal object of this invention is to provide a hand implement, whereby fish, crabs and other slippery or hard-to-handle seafood can be lifted and manipulated to the desired extent, while counting, cleaning or for other purposes.

A further object of the invention is to provide a hand implement of the character stated which is of simple construction and in the form of scissors, so that the action is quick and positive-acting when grasping an item.

Still a further object of the invention is to provide a hand implement of the character stated which is provided with teeth or other gripping means whereby the article, although slippery, is firmly held against displacement.

These and other objects and advantages of the invention will become apparent to the reader of the following description.

In the drawing:

Figure 1 is a side elevational view of the implement with a portion in section;

Figure 2 is a top plan view of the device;

Figure 3 is a cross section taken on line 3—3 of Figure 1.

Referring to the drawing, numerals 5, 6 denote jaws of arcuate shape, the upper jaw 5 being constructed of a pair of elongated members a, a provided with shanks 7, 7 connected to an elongated handle 8, of a size sufficient to receive several fingers of a hand, while the under jaw 6 has a single shank 9 terminating in a thumb receiving loop or handle 10.

The shanks 7, 7 and the shank 9 are pivotally connected together by pin or bolt member 11.

At the jaw ends of the shanks 7, 7 outwardly flaring shoulder portions 12, 12 are provided to determine the spaced relation of the jaw members a, a and the medial portions of the members a, a are bridged by a spacer 13, holding these members a, a in a definite spaced parallel relation to each other, while the single jaw 6 assumes a position between the members a, a but substantially below the same as is apparent in Figures 1 and 2.

The ends of the jaw members a, a may be blunt, as at 14, but it is preferable that the free end of the single jaw 6 be sharp as denoted by numeral 15 so that the tool may be stuck into a board or other structure for holding the same in an upright position, when not in use.

The opposed curved work engaging edges of the jaws 5, 6 are serrated to provide teeth 16, adapted to bite into fish or the surface of whatever item is gripped by the jaws.

It can now be seen, that by grasping the handles 8, 10 and moving the fingers outwardly, the jaws can be opened in order that either the jaw 6 or the jaw members a, a can be disposed under a fish, after which the handles 8, 10 are contracted so that the jaws will firmly grip the work and due to the presence of the teeth 16, firmly grip the fish or crab so that it cannot become displaced.

This implement may be used for handling live crabs which are sometimes dangerous to handle.

It will be observed that the spaced jaw members a, a serve to add stability to the implement, engaging one side of the fish or crab, while the jaw 6 engages the other side of the item at a point midway between the jaw members a, a.

A device of this construction can be manufactured very reasonably and placed on the market at a very low retail price and within the expenditure means of practically anyone. The device can be used for many household purposes, especially in the kitchen.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

An implement of the character described comprising a pair of handles having finger receiving openings, an elongated gripping member extending forwardly from one handle and having flat side faces and being arcuate throughout its length to provide a longitudinally curved inner and outer side edges, a pair of elongated gripping members projecting forwardly from the other handle in transversely spaced relation to each other and being disposed against opposite sides of the first gripping member for a portion of their length and pivotally connected thereto, portions of the pair of gripping members, in front of their pivotal connection with the first gripping member extending away from opposite sides of the first gripping member and then forwardly in transversely spaced relation thereto, the said pair of gripping members being arcuate longitudinally to provide inner side edges curved longitudinally in a direction to the curvature of the first gripping member, the inner side edges of all of said gripping members formed with teeth, and a cross bar extending between the said pair of gripping members and secured to outer edge portions thereof and disposed across the first gripping member and spaced from the front ends of the gripping members.

WILLIAM LLOYD EVERETT.

REFERENCES CITED

The following references are of record in the file of this patent:

UNITED STATES PATENTS

| Number | Name | Date |
| --- | --- | --- |
| D. 90,137 | Gutsche | June 13, 1933 |
| 97,399 | Holmes | Nov. 30, 1869 |
| 354,153 | Laufer | Dec. 14, 1886 |
| 579,347 | Kellnor | Mar. 23, 1897 |
| 874,253 | Scott | Dec. 17, 1907 |
| 1,095,054 | Wiesenfeld | Apr. 28, 1914 |
| 1,569,999 | Nelson | Jan. 19, 1926 |
| 1,753,815 | Woods | Apr. 8, 1930 |